United States Patent
Baker et al.

(10) Patent No.: US 11,676,216 B1
(45) Date of Patent: *Jun. 13, 2023

(54) METHOD AND SYSTEM FOR AUTOMATICALLY DETECTING VEHICLE COLLISIONS FOR INSURANCE CLAIMS

(71) Applicant: UIPCO, LLC, San Antonio, TX (US)

(72) Inventors: Kelly Q. Baker, San Antonio, TX (US); Sumita T. Jonak, San Antonio, TX (US); Will Kerns Maney, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/587,157

(22) Filed: Jan. 28, 2022

Related U.S. Application Data

(63) Continuation of application No. 16/424,668, filed on May 29, 2019, now Pat. No. 11,288,750.

(60) Provisional application No. 62/753,114, filed on Oct. 31, 2018.

(51) Int. Cl.
  G06Q 40/08     (2012.01)
  G07C 5/00      (2006.01)
  G07C 5/08      (2006.01)

(52) U.S. Cl.
  CPC ............ *G06Q 40/08* (2013.01); *G07C 5/008* (2013.01); *G07C 5/08* (2013.01)

(58) Field of Classification Search
  None
  See application file for complete search history.

(56) References Cited

U.S. PATENT DOCUMENTS

| | | | | |
|---|---|---|---|---|
| 6,167,333 A * | 12/2000 | Gehlot | ................... | G08G 1/017 340/901 |
| 8,340,894 B2 * | 12/2012 | Yester | .............. | G08G 1/096791 701/301 |
| 8,618,952 B2 * | 12/2013 | Mochizuki | ....... | G08G 1/096783 340/995.25 |

(Continued)

FOREIGN PATENT DOCUMENTS

CA     2526299     5/2007

OTHER PUBLICATIONS

S. Haria, S. Anchaliya, V. Gala and T. Maru, "Car Crash Prevention and Detection System Using Sensors and Smart Poles," 2018 Second International Conference on Intelligent Computing and Control Systems (ICICCS), Madurai, India, 2018, pp. 800-804. (Year:2018).*

(Continued)

*Primary Examiner* — Mohammad Z Shaikh
(74) *Attorney, Agent, or Firm* — Plumsea Law Group, LLC

(57) ABSTRACT

A system and method for automatically detecting a vehicle collision and taking action in response to the vehicle collision is disclosed. The vehicle collision can be detected by analyzing information from sensors onboard a vehicle, in a mobile device disposed within the vehicle or from roadway sensors. When a collision is detected, an insurance provider can automatically open a new insurance claim. The provider may also use sensed information to detect damaged components of a vehicle and provide information about the damaged components to a vehicle repair facility.

20 Claims, 7 Drawing Sheets

(56) References Cited

U.S. PATENT DOCUMENTS

| | | | |
|---|---|---|---|
| 8,799,034 B1* | 8/2014 | Brandmaier | G07C 5/008 705/4 |
| 8,903,636 B1* | 12/2014 | Al Kandari | G08G 1/0145 701/118 |
| 9,019,092 B1* | 4/2015 | Brandmaier | B60R 21/0136 340/436 |
| 9,440,649 B2* | 9/2016 | Ciotlos | B60W 30/095 |
| 9,453,309 B2* | 9/2016 | Moran | G08G 1/096716 |
| 9,508,200 B1* | 11/2016 | Mullen | G06Q 10/20 |
| 9,679,487 B1* | 6/2017 | Hayward | G07C 5/02 |
| 9,877,176 B2* | 1/2018 | Gabel | H04W 4/029 |
| 10,026,130 B1 | 7/2018 | Konrardy et al. | |
| 10,134,278 B1 | 11/2018 | Konrardy et al. | |
| 10,145,684 B1 | 12/2018 | Tofte et al. | |
| 10,176,713 B2* | 1/2019 | Hong | G08B 25/10 |
| 10,235,882 B1* | 3/2019 | Aoude | G08G 1/093 |
| 10,255,639 B1 | 4/2019 | Friedman et al. | |
| 10,311,655 B2 | 6/2019 | Dahl et al. | |
| 10,336,343 B1 | 7/2019 | Fiedler et al. | |
| 10,345,230 B2* | 7/2019 | Nishimura | G01J 3/42 |
| 10,354,230 B1* | 7/2019 | Hanson | G07B 15/00 |
| 10,392,013 B2* | 8/2019 | Hakki | G08G 1/168 |
| 10,408,700 B2* | 9/2019 | Osawa | G01L 19/0084 |
| 10,486,707 B2* | 11/2019 | Zelman | G08G 1/096725 |
| 10,558,224 B1* | 2/2020 | Lin | G08G 1/165 |
| 10,600,123 B1* | 3/2020 | Medina, III | G06Q 40/08 |
| 10,643,285 B1* | 5/2020 | Tofte | G06Q 30/0201 |
| 10,643,472 B2* | 5/2020 | Song | G06V 10/96 |
| 10,803,746 B2* | 10/2020 | Bai | G06V 40/20 |
| 10,977,881 B1* | 4/2021 | Buentello | G06Q 20/405 |
| 10,984,481 B1* | 4/2021 | Drawert | G06Q 40/08 |
| 2005/0108065 A1* | 5/2005 | Dorfstatter | G06Q 40/08 705/4 |
| 2005/0278082 A1* | 12/2005 | Weekes | G07C 5/008 701/1 |
| 2007/0250334 A1* | 10/2007 | Reeves | G08G 1/0104 340/933 |
| 2007/0276600 A1* | 11/2007 | King | G08G 1/0962 340/436 |
| 2008/0119966 A1* | 5/2008 | Breed | G07C 5/085 701/2 |
| 2008/0306996 A1* | 12/2008 | McClellan | G06Q 10/06 |
| 2009/0105902 A1* | 4/2009 | Choi | G08G 1/205 701/33.4 |
| 2010/0007523 A1* | 1/2010 | Hatav | G01C 21/3697 340/901 |
| 2010/0073194 A1* | 3/2010 | Ghazarian | G08G 1/096783 340/901 |
| 2010/0131304 A1* | 5/2010 | Collopy | G06Q 30/0224 705/4 |
| 2010/0138242 A1* | 6/2010 | Ferrick | G06Q 40/00 705/306 |
| 2010/0174564 A1 | 7/2010 | Stender et al. | |
| 2011/0035140 A1 | 2/2011 | Candy | |
| 2011/0298603 A1* | 12/2011 | King | G08G 1/042 340/436 |
| 2012/0072243 A1 | 3/2012 | Collins et al. | |
| 2012/0161951 A1 | 6/2012 | Ito et al. | |
| 2013/0086109 A1 | 4/2013 | Huang | |
| 2013/0218604 A1* | 8/2013 | Hagelstein | G06Q 40/08 705/4 |
| 2013/0311641 A1 | 11/2013 | Chow et al. | |
| 2014/0009307 A1* | 1/2014 | Bowers | G08G 1/166 340/901 |
| 2014/0232564 A1 | 8/2014 | Garay et al. | |
| 2015/0006023 A1 | 1/2015 | Fuchs | |
| 2015/0088334 A1* | 3/2015 | Bowers | G07C 5/008 701/1 |
| 2015/0112543 A1 | 4/2015 | Binion et al. | |
| 2015/0127570 A1 | 5/2015 | Doughty et al. | |
| 2015/0307108 A1* | 10/2015 | Chollet | H04N 7/18 348/149 |
| 2016/0076207 A1 | 3/2016 | Moran et al. | |
| 2016/0125739 A1 | 5/2016 | Stewart et al. | |
| 2018/0370528 A1 | 12/2018 | Rittger et al. | |
| 2019/0106020 A1 | 4/2019 | Qi et al. | |
| 2021/0316720 A1 | 10/2021 | Dewey et al. | |

OTHER PUBLICATIONS

Robert P. Loce; Raja Bala; Mohan Trivedi, "Road Condition Monitoring," in Computer Vision and Imaging in Intelligent Transportation Systems, IEEE, 2017, pp. 375-397 (Year: 2017).

S Haria, S. Anchaliya, V. Gala and T. Maru, "Car Crash Prevention and Detection System Using Sensors and Smart Poles," 2018 Second International Conference on Intelligent Computing and Control Systems (ICICCS), 2018, pp. 800-804 (Year: 2018).

* cited by examiner

METHOD AND SYSTEM FOR AUTOMATICALLY DETECTING VEHICLE COLLISIONS FOR INSURANCE CLAIMS

CROSS-REFERENCE TO RELATED APPLICATIONS

This application is a continuation of and claims priority to U.S. patent application Ser. No. 16/424,668, filed on May 29, 2019 and titled "Method and System for Automatically Detecting Vehicle Collisions for Insurance Claims", which application claims the benefit of U.S. Provisional Patent Application No. 62/753,114 filed Oct. 31, 2018, and titled "Method and System for Automatically Detecting Vehicle Collisions for Insurance Claims," the disclosures of which applications are incorporated by reference herein in their entirety.

TECHNICAL FIELD

The present disclosure generally relates to methods and systems for detecting vehicle collisions for insurance claims, and in particular to detecting vehicle collisions by analyzing sensory information from the vehicle.

BACKGROUND

Many customers may feel frustrated by the typical vehicle insurance claims process. For example, after a vehicle collision many drivers may feel overwhelmed by the thought of having to file an insurance claim. Additionally, the claims process can take weeks for a claim to be processed and a vehicle to be repaired. Sometimes there is a delay caused by insufficient coordination between the insurance provider and a third party making repairs to the vehicle.

There is a need in the art for a system and method that addresses the shortcomings discussed above.

SUMMARY

In one aspect, a method of opening an insurance claim for a vehicle based on detecting a vehicle collision includes the steps of retrieving sensory information from a sensor, analyzing the sensory information, detecting a collision, and opening an insurance claim for the vehicle corresponding to the collision.

In another aspect, a method of sending collision information to a repair facility based on estimated vehicle damage from a vehicle collision includes the steps of receiving notification of the vehicle collision, receiving sensed information from a sensor, detecting a damaged vehicle component by analyzing the sensed information, and sending collision information to the repair facility, where the collision information includes information about the damaged vehicle component.

In another aspect, a method of adjusting an insurance policy for a vehicle includes the steps of monitoring sensory information from one or more sensors, detecting collisions associated with the vehicle and tracking the collisions as historical collision information, and adjusting the insurance policy according to the historical collision information.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide system and methods for automatically detecting when a vehicle collision has occurred. The system and method can use sensed information from vehicle sensors, sensors from a mobile device (such as a smartphone) that is in the vehicle at the time of the collision, and/or from roadway sensors. By analyzing the sensed information, the system can determine if a vehicle collision has occurred and take appropriate action. When the system determines that the collision warrants opening a new claim, the system can automatically open the new claim on behalf of the policy holder and without intervention by the policy holder. By automatically opening a new claim in response to a detected collision, the system and method can help improve customer satisfaction.

The system may also be able to identify damaged vehicle components and send information about these damaged vehicle components to a vehicle repair facility. By automatically identifying damaged vehicle components and reporting information to a repair facility, the system and method can help reduce claim processing times and improve customer satisfaction.

The system may also track vehicle collisions over time, including unreported collisions, or collisions where no claims are filed. If the vehicle is involved with too many collisions over time, the system and method can be used to automatically adjust the corresponding insurance policy. By automatically adjusting the insurance policy in response to tracked collisions, the system and method can reduce costs for the insurance provider by adjusting insurance premiums (or deductibles) in response to updated insurance risks.

Figure 1:
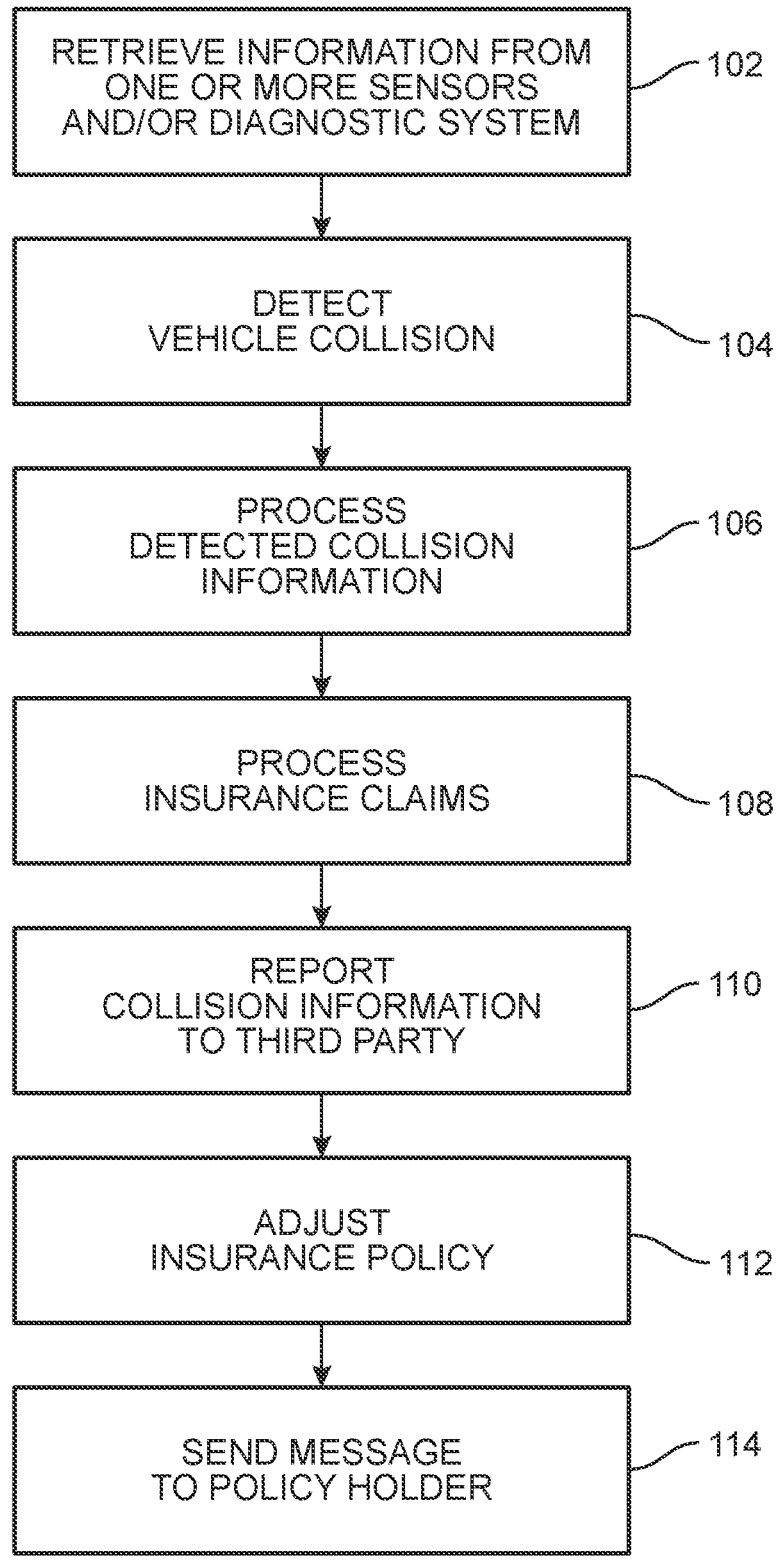
FIG. 1 is a schematic view of a process for detecting a collision and taking action in response to the detected collision, according to an embodiment.

FIG. 1 is a schematic view of a process for detecting a vehicle collision and taking one or more actions associated with an insurance policy of the vehicle in response. In the present embodiment, one or more of the steps in this process may be performed by an insurance provider. The term "insurance provider" (or simply "provider"), as used herein refers to any institutions or companies that provide insurance products. Insurance products can include home owner's insurance, renter's insurance, commercial property insurance, and vehicle insurance. An insurance product may be characterized by an insurance policy, which is a contract between an insurance provider (the "insurer") and a policy holder (the "insured"). In cases where vehicle insurance is provided, the policy holder may be an owner, or driver, of a vehicle. The policy holder may also be referred to as a customer of the insurance provider.

In step 102, a provider may retrieve information from one or more sensors and/or from a diagnostic system of the vehicle. As discussed in further detail below, the sensors could be associated with a vehicle, or with a user device disposed within the vehicle. In addition, the sensors could be associated with a roadway or intersection. That is, the sensors could be disposed externally to the vehicle. The type of sensors could vary, and may generally include optical based sensors (for example, cameras), audible based sensors, haptic or motion based sensors, gyroscopes, accelerometers, wheel speed sensors, crash sensors as well as other suitable sensors. Information could be retrieved directly from the sensors, or may be retrieved through the vehicle's onboard diagnostics system (OBD), which may monitor some, or all, of a vehicle's onboard sensors.

In some embodiments, during step 102, the computing system may also retrieve any other kind of tracked information from the onboard diagnostics system, including non-sensed information. For example, if the onboard diagnostics system is in communication with a vehicle safety system and tracks its state over time (including "enabled" or "disabled" states), the computing system could retrieve this tracked information.

Next, in step 104, the information from the one or more sensors may be used to detect a vehicle collision. As used herein, the term "vehicle collision" may refer to any collision between two or more vehicles, or between a single vehicle and any other object that might potentially cause damage (either to the vehicle or to the object). Exemplary types of collisions include, but are not limited to: head-on collisions between two vehicles, a collision in which one vehicle rear ends another vehicle, and collisions where one vehicle collides with the side (driver or passenger) of another vehicle. Other examples of collisions can include collisions between a vehicle and a wall and collisions between a vehicle and a pedestrian.

In step 106, the provider may process the detected collision information. Depending on the nature and severity of the collision, the provider may take further action. In step 108, the provider may process one or more insurance claims related to the collision. This may include opening new insurance claims. In step 110, the provider may report collision information to a third party. For example, the provider could send information about any detected damage to a vehicle repair facility (such as a body shop). The vehicle repair facility could use this information to estimate repair costs and ensure they schedule in adequate time to make the repair.

In step 112, the provider may adjust an insurance policy associated with the vehicle. This may be done in cases where a provider notices that the vehicle has been involved in multiple collisions, including, possibly, unclaimed and/or unreported collisions. In some cases, the provider could automatically raise the insurance premium or deductible associated with the insurance policy.

In step 114, the provider may send one or more messages to the policy holder. The messages can include information regarding any actions that were taken. These include informing the policy holder about any new claims that have been opened in response to the collision, as well as any changes to the insurance policy. Messages could be sent by email, text or any other suitable mode of communication. In some embodiments, the message could be pushed to a mobile device through an application supported by the insurance provider.

Figure 2:
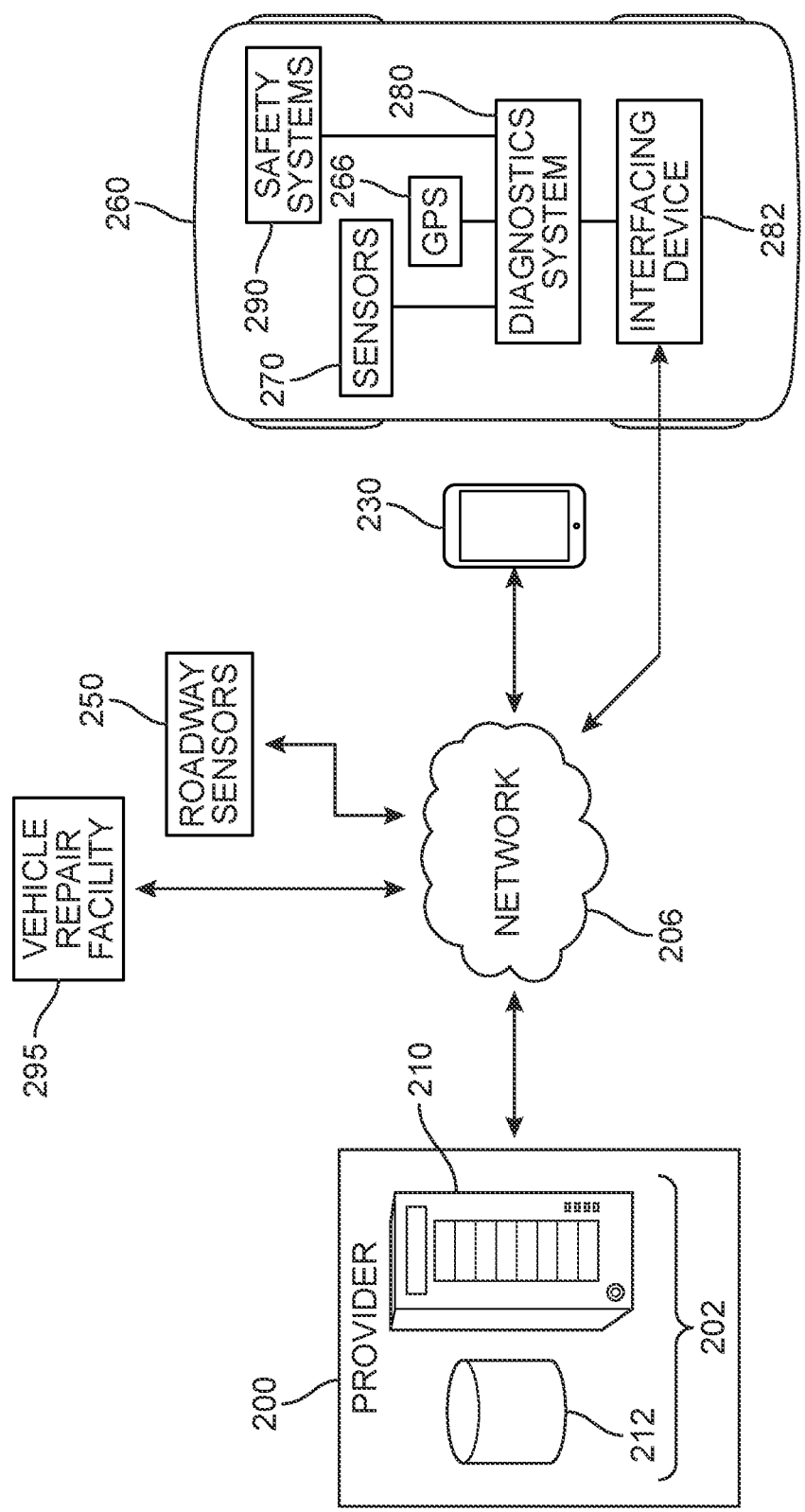
FIG. 2 is a schematic view of a system for receiving sensed information and analyzing the information to detect a vehicle collision and take action in response, according to an embodiment.

FIG. 2 is a schematic view of many of the systems and devices that may be used to extract and process sensory data from a vehicle or other device. Referring to FIG. 2, provider 200 may comprise a centralized computing system 202. The term "computing system" refers to the computing resources of a single computer, the partial computing resources of a single computer, a plurality of computers communicating with one another, or a network of remote servers. In an exemplary embodiment, computing system 202 includes at least one server.

In the embodiment of FIG. 2, centralized computing system 202 comprises one or more computing devices 210 (for example, a server) that may be in communication with one or more databases 212. Computing device 210 may include one or more processors and a non-transitory computer readable medium. Instructions stored on the non-transitory computer readable medium may be executed by the one or more processors. Databases 212 could be co-located with computing device 210 or could be remote databases that are accessible by computing device 210 over network 206. Databases 212 can include any kind of storage devices, including but not limited magnetic, optical, magneto-optical, and/or memory, including volatile memory and non-volatile memory.

In some embodiments, information from a plurality of sensors 270 disposed in or on a vehicle may be accessible through a diagnostics system 280 of vehicle 260. Diagnostics system 280 may be associated with on-board diagnostics (OBD) capabilities. In some cases, diagnostics system 280 may comprise part of an onboard computing system of vehicle 260.

To access diagnostics system 280, some embodiments may include an interfacing device 282. Interfacing device 282 may include any device that can interface with diagnostics system 280 and also communicate with computing device 202 over a network, or wired connection. Interfacing device 282 could communicate with diagnostics system 280 using various interfacing protocols and hardware. Exemplary interfaces include OBD-I, OBD-1.5, and OBD-II. Interfacing devices can comprise hand-held scan tools, mobile device-based tools, PC-based scan tools, data loggers and telematics devices.

In one embodiment, interfacing device 282 is a telematics device. The term "telematics device" refers to any device that can plugged into an interfacing port (for example, an OBD-II port) on a vehicle and used to track information from sensors and/or other onboard systems. In some embodiments, a telematics device may be configured to wirelessly communicate with other computing devices. In other embodiments, a telematics device may track and store information that can be accessed at a later time by removing the device and plugging it into another computing device (for example, using a USB cord).

In some embodiments, location information for a vehicle can also be retrieved using interfacing device 282. In the example of FIG. 2, vehicle 260 includes an onboard GPS receiver 266 that can receive GPS information. This information can be accessed by interfacing device 282 via diagnostics system 280. In other embodiments, GPS information, or any other location or navigation information, can be retrieved from any other suitable devices in a vehicle.

Information about one or more vehicle safety systems 290 could be retrieved using interfacing device 282. In some embodiments, diagnostics system 280 may receive information from one or more safety systems and this information could be available to a provider through interfacing device 282. Because vehicle safety systems already monitor driving conditions and potentially hazardous situations, information from these safety systems could be used to infer if a collision is about to occur or has already occurred.

Provider 200 can retrieve various kinds of real time or tracked sensory information associated with vehicle 260 via communication with interfacing device 282. In some embodiments, this communication occurs over network 206. In other embodiments, interfacing device 282 could be a removable telematics device that can be unplugged from diagnostics system 280 and physically plugged into a device associated with computing system 202.

Provider 200 could also communicate with a user device 230, which may be carried in, or adjacent to, vehicle 260. User device 230 may comprise a computing system for processing and communicating information. A user device may generally include a processor, a data storage component, and a display. A user device may also include components to facilitate communication with external systems (for example, hardware and software components to enable communication over network 206). In some cases, a user device includes one or more physical buttons. In some cases, a user device includes touchscreen controls. Additionally, user device 230 could include additional sensors including, but not limited to: accelerometers, gyroscopes, magnetometers, GPS receivers, barometers, proximity sensors and ambient light sensors.

In the exemplary embodiment of FIG. 2, user device 230 comprises a mobile device. Specifically, user device 230 comprises smartphone. In other embodiments, user device 230 could be a tablet computing device. In still other embodiments, however, a user device could comprise a laptop, a desktop computer, or similar kind of device.

Any of the devices described above may be configured to operate in a client-server relationship with computing system 202 of provider 200. For example, computing system 202 may include a server that communicates with interfacing device 282 over network 206. Computing system 202 could also communicate with sensors or local computing devices that are themselves connected to sensors. Information from these various devices may be sent to computing system 202 for analysis and/or storing data.

In some embodiments, user device 230 may run client software to control one or more sensors of the device, retrieve sensory information, store sensory information and/or send sensory information to computing system 202 for analysis. In addition, messages may be automatically sent to user device 230 to inform a user of changes to their policy and/or to request further action regarding their policy.

Provider 200 could also communicate with one or more roadway sensors 250. Roadway sensors 250 may include any sensors that are disposed externally to a vehicle. Information from roadway sensors 250 may be available over network 206.

Provider 200 could also communicate with a vehicle repair facility 295. A vehicle repair facility 250 could be a body shop or other repair facility where a vehicle may be repaired following a collision. As discussed in further detail below, provider 200 may automatically detect collision information and send the collision information to vehicle repair facility 295 after a collision has been detected. In some cases, computing system 202 of provider 200 could communicate with one or more servers of vehicle repair facility 295 over network 206.

Figure 3:
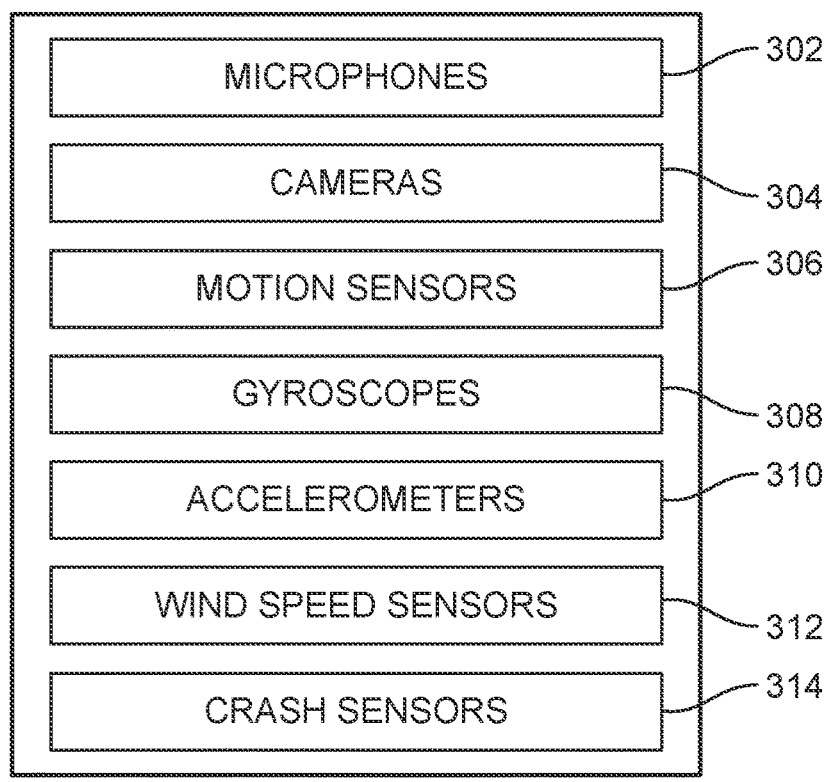
FIG. 3 is a schematic view of various sensors that could be used with the exemplary system of FIG. 2.

FIG. 3 is a schematic view of various kinds of sensors that could be associated with either vehicle 260 or user device 230. It may be appreciated that different sensors can be used with each device and a single device need not include all of the following sensors. For example, user device 230 would not include wheel speed sensors 312 depicted in FIG. 3.

Microphones 302 could include any kind of microphones known in the art for use in vehicles or mobile devices. User device 230 may include microphones. In addition, vehicle 260 could include microphones embedded in a dashboard, in a rearview mirror or other locations. Microphones in a vehicle may be useful for speakerphone functionality and for communicating audibly with an onboard intelligent voice assistant. In some embodiments, microphones 302 could be used to detect sounds associated with collisions, such as the sound of breaking glass and/or the sound of crushing metal.

Cameras 304 could include any kind of cameras known in the art for use in vehicles or mobile devices. User device 230 may include one or more cameras. In addition, vehicle 260 could include cameras in a dashboard or rearview mirror, for example. In some embodiments, cameras 304 could be used to detect collisions. In some cases, computing system 202 could include machine learning algorithms trained to detect features associated with collisions in images. These features could include broken glass, dents or bends in the vehicle chassis, deployed airbags or other visually identifiable features.

Motion sensors 312 could comprise any kinds of motions sensors known in the art. These may include, but are not limited to: passive infrared sensors, microwave sensors, and ultrasonic sensors. Motion sensors could be deployed at selective locations in a vehicle. In some embodiments, one or more motion sensors 312 may be disposed in or near a driver's seat, where haptic feedback may be provided. Sensors could also be disposed on a steering wheel or headrest, where haptic feedback may also be provided. In some embodiments, motion sensors 312 could be used to detect vibrations from a vehicle collision.

Other sensors can include sensors for detecting driving conditions. Driving conditions can be inferred from sensory information retrieved from gyroscopes 308, accelerometers 310 and wheel speed sensors 312, as well as possibly from other sensors. By analyzing vehicle acceleration, orientation, angular velocity and wheel speed, a computing system may be able to detect if a collision has likely occurred.

Some embodiments can also include crash sensors 314. Vehicles can include crash sensors that are used for various purposes. For example, an onboard computer may monitor crash sensors to determine when to deploy one or more airbags, or enable other safety systems. In some embodiments, a computing system could have access to sensed information from crash sensors 314 through an onboard diagnostics system.

Figure 4:
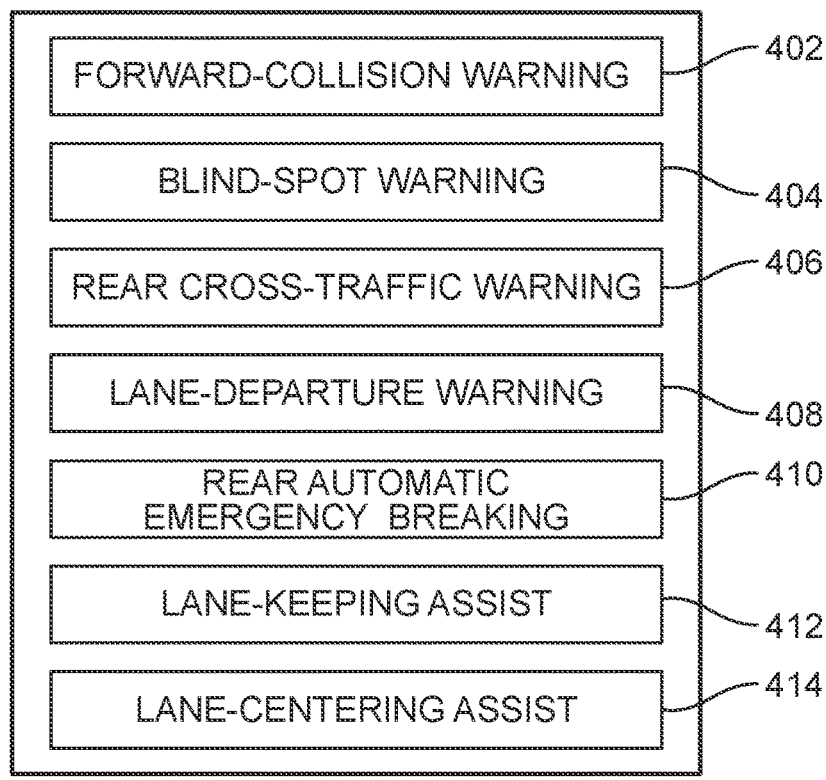
FIG. 4 is a schematic view of a various vehicle safety systems for a vehicle that could be used with the exemplary system of FIG. 2.

FIG. 4 is a schematic view of a plurality of vehicle safety systems that could be incorporated into a vehicle. It may be appreciated that different embodiments could incorporate a different combinations of safety systems. Some embodiments, for example, could include only a single safety system.

Referring to FIG. 4, safety systems 290 may include various warning systems such as a forward-collision warning system 402, a blind-spot warning system 404, a rear cross-traffic warning system 406, and a lane departure warning system 408. These warning systems may help drivers to avoid dangerous situations such as potential collisions or a vehicle unintentionally departing from its lane. In addition, safety systems 290 could also include various safety assistance systems, such as a rear automatic emergency breaking system 410, lane-keeping assist system 412 and a lane-centering assist system 414. Information gathered from one or more of these vehicle safety systems could be used to infer if a collision is likely to occur, or if a collision has already occurred.

Figure 5:
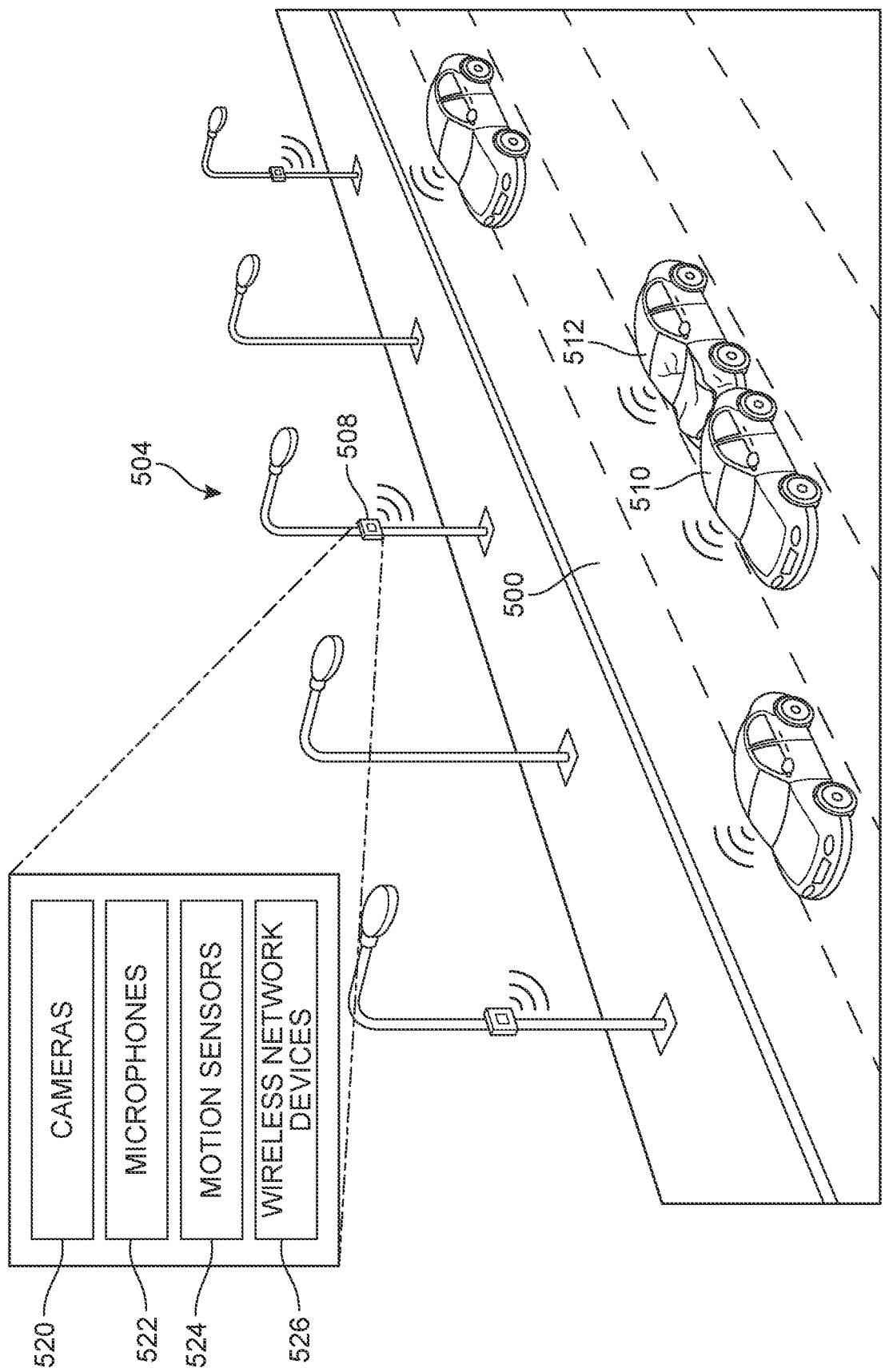
FIG. 5 is a schematic view of various roadway sensors that could be used with the exemplary system of FIG. 2.

FIG. 5 is a schematic view of various roadway sensors that could be used with the present embodiments. In the example of FIG. 5, a plurality of sensors are disposed along roadway 500 at regular intervals. Specifically, a plurality of sensory assemblies are disposed on streetlights 504. An exemplary sensory assembly 508 can include cameras 520, microphones 522, motion sensors 524 and wireless network devices 526.

Cameras 520 may take images of roadway 500 as well as any passing vehicles. Cameras 520 could take still images or video. Image information captured by cameras 520 could be analyzed to detect problematic driving behaviors (such as swerving, speeding or reckless driving). In some embodiments, image information captured by cameras 520 could also be analyzed to detect vehicle collisions.

Microphones 522 may capture sounds coming from roadway 500, including sounds generated by passing vehicles. Audio information captured by microphones 522 could be analyzed to detect collisions. For example, microphones 522 could detect the sound of breaking glass or crushing metal.

Motion sensors 524 may capture motion along, or near, roadway 500. In some cases, motion information detected by motion sensors 524 could be used to trigger one or more other sensors, such as cameras or microphones. This allows other sensors to remain inactive until motion is detected. In some cases, information from motion sensors 524 could also be used to detect vehicle collisions, either directly or indirectly. For example, if a motion sensor detects that a vehicle is not moving in the middle of a roadway, this information can be used to infer that the vehicle has either broken down or been involved in a collision.

Wireless network devices 526 may include any devices capable of communicating over one or more wireless networks. These include wide area networks, local area networks and personal area networks. In some embodiments, wireless network devices 526 could communicate with passing vehicles to gather information about the vehicles and the overall flow of traffic. In addition, wireless network devices 526 could be used to transmit sensed information to another node in a communication network.

As seen in FIG. 5, a vehicle 512 has just rear ended a vehicle 510 on roadway 500. Information about this collision can be gathered not only from sensors onboard vehicle 510 and/or vehicle 512, but also from roadway sensors associated with sensor assembly 508. Specifically, information from onboard crash sensors, as well as onboard accelerometers and onboard wheel speed sensors could be analyzed to detect that a collision has occurred. Also, information from roadway cameras and roadway microphones could also be analyzed to detect a collision. Additionally, information from roadway cameras could capture images that may be studied to detect damaged components of vehicle 510 or vehicle 512.

Figure 6:
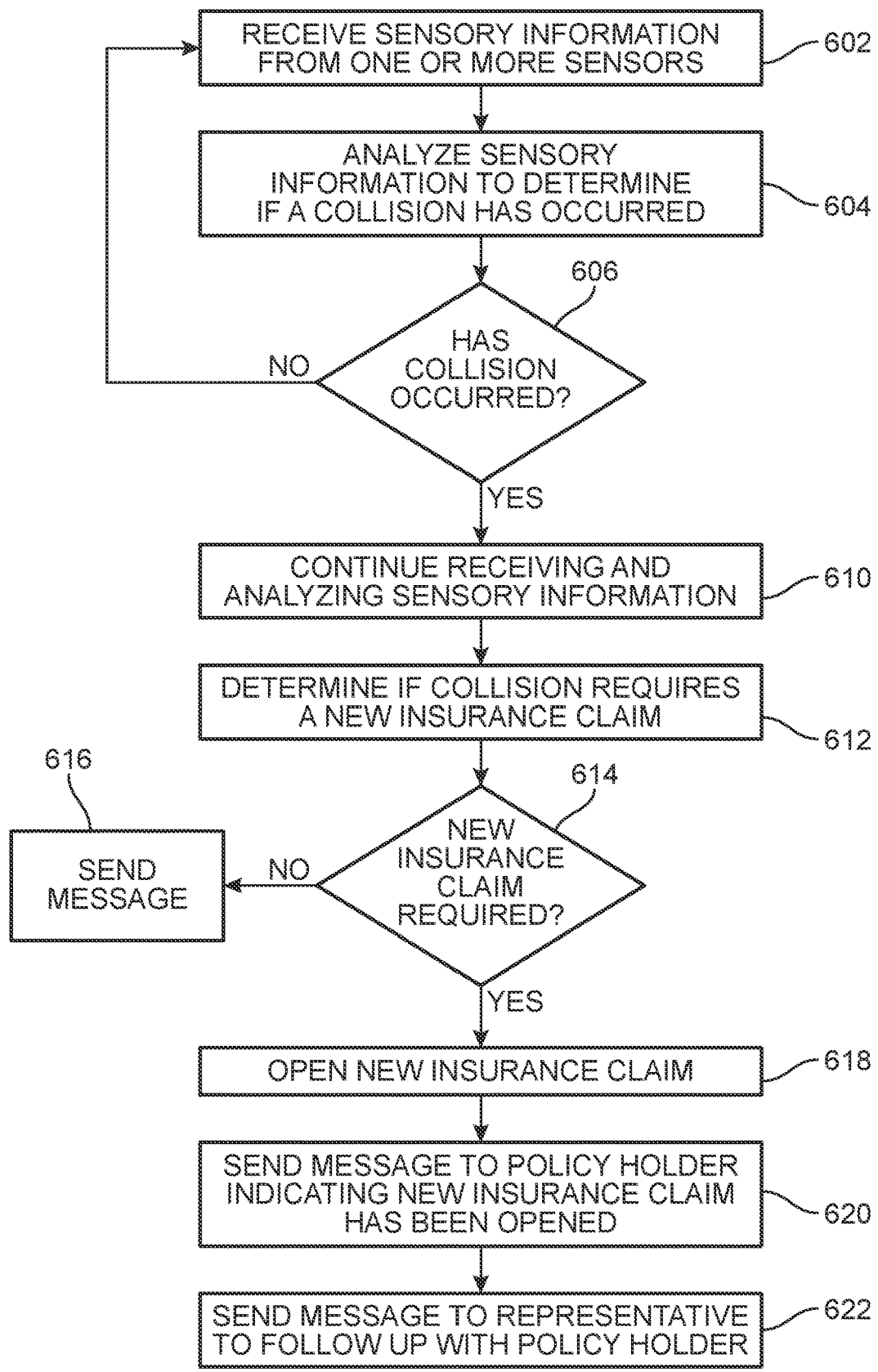
FIG. 6 is a schematic view of a process for opening a new insurance claim in response to a detected vehicle collision, according to an embodiment.

FIG. 6 is a schematic process for detecting vehicle collisions and opening a new insurance claim in response to detecting the vehicle collision. For convenience, the following steps are described as being performed by a computing system operated by provider (e.g., provider 200 in FIG. 2). However, it may be appreciated that some of these steps can be performed by one or more systems operated by another entity. In one embodiment, the following steps can be performed by software running on a computing system (e.g., computing system 202) that is maintained by a provider (e.g., provider 200).

In step 602, a computing system may receive sensory information from one or more sensors. This may include information sensed from sensors onboard a vehicle, from sensors in a mobile device within the vehicle and/or from roadway sensors. Next, in step 604, the computing system can analyze the sensory information to determine if a collision has occurred. If the computing system determines that a collision has not occurred at step 606, the computing system may return to step 602 to continue receiving information from sensors. If the computing system determines that a collision has occurred at step 606, the computing system proceeds to step 610.

In step 610, the computing system continues to receive information from one or more sensors. The computing system may also continue to analyze the sensory information. Next, in step 612, the computing system determines if the collision requires a new insurance claim based on the analysis determined in step 610.

If the computing system determines that a new insurance claim is not required in step 614, the computing system may proceed to step 616. In step 616, the computing system may send a message to the policy holder indicating that a collision has been detected, but that no new insurance claim is required. Alternatively, in some cases, the computing system could send a message to a representative of the provider requesting further review of the collision. The representative could then determine if a new claim is necessary.

If the computing system determines that a new insurance claim is required in step 614, the computing system may proceed to step 618. In step 618, the computing system may open the new insurance claim. This step may be performed without any intervention by the policy holder. In some cases, the new insurance claim could be opened immediately following the collision.

In step 620, the computing system may send a message to the policy holder indicating that the new insurance claim has been opened. This may be useful to the policy holder, who may find the thought of submitting a new claim stressful and/or tedious. Instead of the policy holder calling the insurance provider or submitting a new claim online, the policy holder simply waits for the insurance provider to open the claim and send the policy holder the claim information. In some cases, the message could include a request for additional information that is necessary to complete the process of opening the claim, or information needed to proceed to a next step in the claim process.

In step 622, the computing system may send a message to a representative (that is, an employee) of the insurance provider to follow up with the policy holder regarding the new insurance claim. This may include having the representative confirm that the policy holder understands the new claim and answering any questions about the claim.

Figure 7:
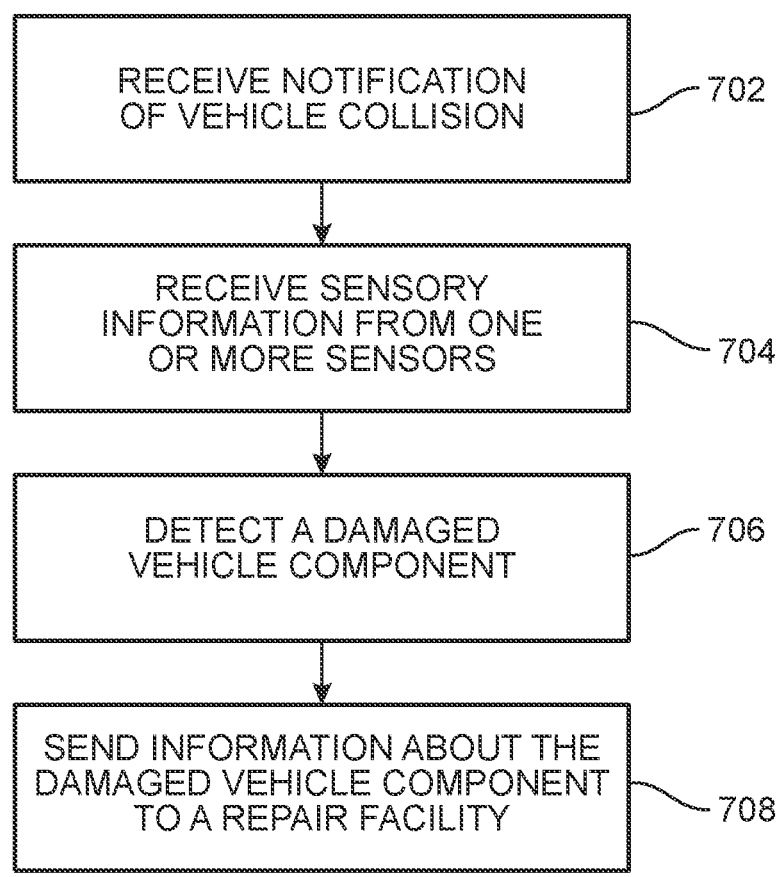
FIG. 7 is a schematic view of a process for detecting a damage to a vehicle and sending information to a repair facility, according to an embodiment.

FIG. 7 is a schematic view of a process for detecting and sending information about a damaged vehicle component to a repair facility. In step 702, the computing system may receive notification of a vehicle collision. In some cases, this notification could be generated by a system or process that automatically detects vehicle collisions, including the process described above in FIG. 6. In other cases, the notification could come from another system or process within the computing system.

In step 704, the computing system may receive sensory information from one or more sensors. This may include information sensed from sensors onboard a vehicle, from sensors in a mobile device disposed in the vehicle and/or from roadway sensors. The sensed information may be information about a vehicle that has just been in a collision and may be used to analyze and gather information about the collision.

In step 706, the computing system detects a damaged vehicle component. As an example, the computing system could receive image information from one or more cameras (including vehicle cameras, mobile device cameras and roadway cameras). The image information could show structural damage to part of a vehicle. The structural damage may be detectable using known machine vision algorithms or other known machine learning algorithms. For example, the computing system could apply a machine learning algorithm to an image to detect a damaged driver's side door.

Once a damaged vehicle component is detected in step 706, the computing system can proceed to step 708. At step 708, the computing system can send information about the damaged vehicle component to a repair facility. This information could include, for example, a listing of the damaged part and an image of the damage.

Figure 8:
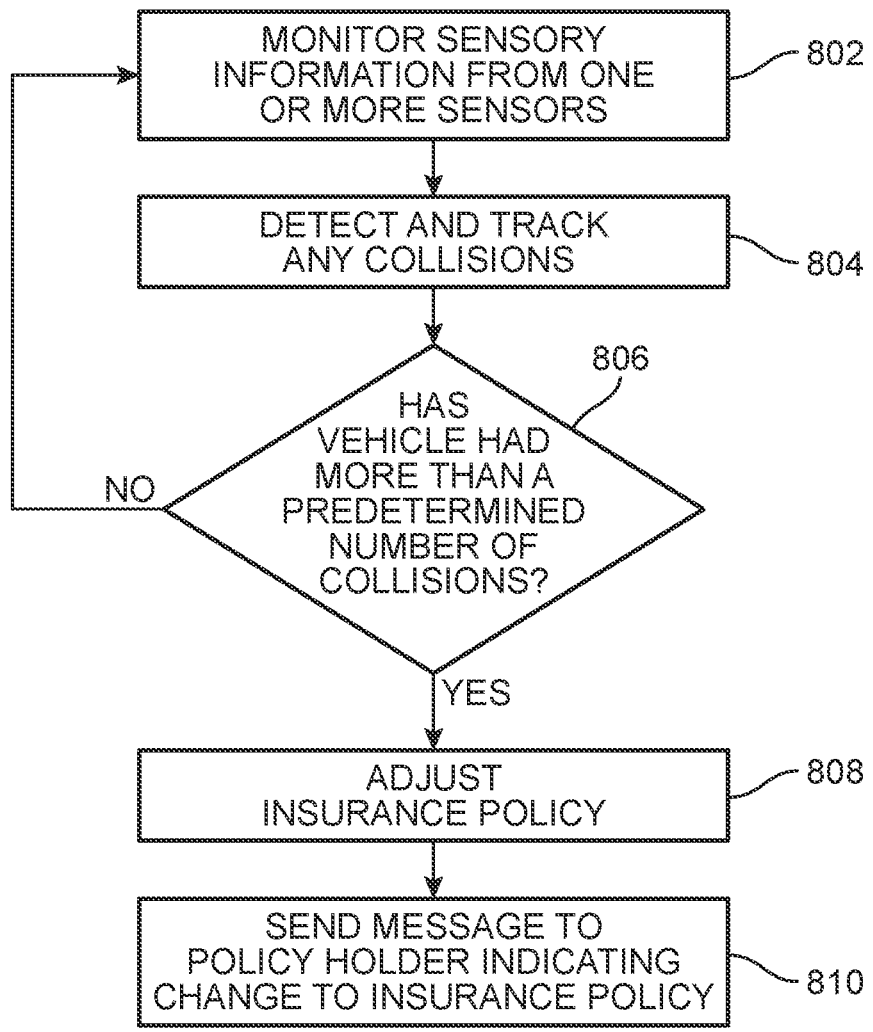
FIG. 8 is a schematic view of a process for adjusting an insurance policy in response to detecting multiple vehicle collisions from sensory information.

FIG. 8 is a schematic view of a process for detecting and tracking collisions associated with a vehicle over time, and adjusting an insurance policy in response. In step 802, the computing system can monitor sensory information from one or more sensors. Next, in step 804, the computing system can detect and track any collisions. As new vehicle collisions are detected they can be added to the historical collision information that is maintained by the computing system. The historical collision information can include not only the time and date of a collision, but also details about the type of collision, the extent of damage and any other information that can be gathered from analysis of the sensory information. The system could also track any claims that are filed for a particular collision.

In step 806, the computing system can then check to see if the vehicle has had more than a predetermined number of collisions. The predetermined number can be selected by the provider and could be retrieved from memory at the time of the analysis. If the vehicle has not been involved in more than a predetermined number of collisions, the computing system can proceed back to step 802 to continue monitoring sensory information. Step 802 and step 804 can be repeated until a vehicle has been involved in more than the predetermined number of collisions.

If the vehicle has been involved in more than the predetermined number of collisions, the computing system proceeds from step 806 to step 808. At step 808, the computing system may adjust the insurance policy. During this step, the computing system may consider the historical collision information, which may provide information not only about the total number of collisions, but also information about each collision. For example, the computing system may raise an insurance premium and/or deductible in response to the increased risk associated with the relatively large number of vehicle collisions. In step 810, the computing system may send a message to the policy holder indicating and changes to the insurance policy.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A system for detecting a vehicle collision-on a roadway, comprising:
   a plurality of roadway sensors disposed on streetlights along a roadway at regular intervals, wherein each roadway sensor of the plurality of roadway sensors comprises at least a camera and a motion sensor;
   a computing device comprising at least one processor in communication with the plurality of roadway sensors;
   wherein the motion sensor of at least one roadway sensor of the plurality of roadway sensors is configured to detect motion along the roadway on which a vehicle is traveling and, in response to the motion detected by the motion sensor of the at least one roadway sensor, trigger the camera of the at least one roadway sensor to capture image information of the vehicle on the roadway;
   wherein the at least one processor of the computing device is configured to:
      obtain sensory information retrieved from: (1) at least one sensor associated with the vehicle, and (2) the at least one roadway sensor of the plurality of roadway sensors disposed externally from the vehicle-on a streetlight along the roadway on which the vehicle is traveling;
      analyze the sensory information from both of the at least one sensor associated with the vehicle and the at least one roadway sensor, wherein the sensory information from the at least one sensor associated with the vehicle includes one or more of an acceleration, an orientation, an angular velocity, and a wheel speed of the vehicle, and wherein the sensory information from the at least one roadway sensor includes the image information of the vehicle captured by the camera of the at least one roadway sensor of the plurality of roadway sensors disposed on the streetlight along the roadway on which the vehicle is traveling;
      based on the analyzed sensory information, detect a collision of the vehicle using the one or more of acceleration, orientation, angular velocity, and wheel speed of the vehicle, and detecting damage to the vehicle from the image information using machine vision algorithms, wherein the machine vision algorithms are trained to detect damage to the vehicle from features associated with collisions in the image information, the features including one or more of broken glass, dents or bends in a vehicle chassis, and deployed airbags; and
      in response to detecting the collision, automatically open an insurance claim for the vehicle corresponding to the collision.

2. The system according to claim 1, wherein the computing device is associated with an insurance provider and wherein the insurance claim is opened with the insurance provider.

3. The system according to claim 1, wherein the computing device comprises a centralized computer system including at least one server.

4. The system according to claim 1, wherein each roadway sensor of the plurality of roadway sensors further comprises a microphone.

5. The system according to claim 4, wherein the at least one processor of the computing device is further configured to:
   obtain audio information captured by the microphone of the at least one roadway sensor; and
   analyze the audio information to detect a sound of breaking glass or crushing metal to detect the collision.

6. The system according to claim 1, wherein each roadway sensor of the plurality of roadway sensors further comprises a wireless network device.

7. The system according to claim 6, wherein the wireless network device is configured to communication with vehicles on the roadway.

8. A system for detecting a vehicle collision-on a roadway, comprising:
   a plurality of roadway sensors disposed on streetlights along a roadway at regular intervals, wherein each roadway sensor of the plurality of roadway sensors comprises at least a camera and a motion sensor;
   a computing device comprising at least one processor in communication with the plurality of roadway sensors;
   wherein the motion sensor of at least one roadway sensor of the plurality of roadway sensors is configured to detect motion along the roadway on which a vehicle is traveling and, in response to the motion detected by the motion sensor of the at least one roadway sensor, trigger the camera of the at least one roadway sensor to capture an image of the vehicle on the roadway;

wherein the at least one processor of the computing device is configured to:

receive notification of a vehicle collision by at least one sensor onboard the vehicle;

obtain sensed information retrieved from: (1) at least one camera associated with the vehicle, and (2) the at least one roadway sensor of the plurality of roadway sensors disposed externally from the vehicle on a streetlight along the roadway on which the vehicle is traveling, wherein the sensed information from the at least one camera associated with the vehicle and the sensed information from the at least one roadway sensor includes image information of the vehicle, wherein the image information shows structural damage to a part of the vehicle;

detect a damaged vehicle component of the vehicle by analyzing the sensed information from both of the at least one sensor associated with the vehicle and the at least one roadway sensor using machine vision algorithms to detect the damaged vehicle component from the image information, wherein the machine vision algorithms are trained to detect the damaged vehicle component from features associated with collisions in the image information, the features including one or more of broken glass, dents or bends in a vehicle chassis, and deployed airbags; and in response to detecting the damaged vehicle component, automatically send collision information associated with the vehicle to a repair facility, the collision information including information about the damaged vehicle component; and open an insurance claim associated with the vehicle collision, wherein the collision information is associated with the insurance claim.

9. The system according to claim 8, wherein the collision information automatically sent to the repair facility further includes: (1) a listing of the damaged vehicle component detected by the machine vision algorithms from the sensed information, and (2) an image showing the damaged vehicle component.

10. The system according to claim 8, wherein the computing device obtains the sensed information from the at least one camera associated with the vehicle from an onboard diagnostics system of the vehicle.

11. The system according to claim 8, wherein the at least one camera associated with the vehicle is a mobile device disposed in the vehicle when the sensory information is obtained.

12. The system according to claim 8, wherein the computing device is associated with an insurance provider and wherein the insurance claim is opened with the insurance provider.

13. The system according to claim 12, wherein the computing device associated with the insurance provider communicates with a server of the repair facility to send the collision information.

14. A system for detecting a vehicle collision-on a roadway, comprising:

a plurality of roadway sensors disposed on streetlights along a roadway at regular intervals, wherein each roadway sensor of the plurality of roadway sensors comprises at least a camera and a motion sensor;

a computing device comprising at least one processor in communication with the plurality of roadway sensors;

wherein the motion sensor of at least one roadway sensor of the plurality of roadway sensors is configured to detect motion along the roadway on which a vehicle is traveling and, in response to the motion detected by the motion sensor of the at least one roadway sensor, trigger the camera of the at least one roadway sensor to capture image information of the vehicle on the roadway;

wherein the at least one processor of the computing device is configured to:

obtain sensory information retrieved from one or more sensors, including (1) at least one sensor associated with the vehicle, and (2) the at least one roadway sensor of the plurality of roadway sensors disposed externally from the vehicle on a streetlight along the roadway on which the vehicle is traveling, wherein the sensory information from the at least one sensor associated with the vehicle includes one or more of an acceleration, an orientation, an angular velocity, and a wheel speed of the vehicle, and wherein the sensory information from the at least one roadway sensor includes the image information of the vehicle from the camera of the at least one roadway sensor of the plurality of roadway sensors disposed on the streetlight along the roadway on which the vehicle is traveling;

detect, based on the sensory information from both of the at least one sensor associated with the vehicle and the at least one roadway sensor, one or more collisions associated with the vehicle using the one or more of acceleration, orientation, angular velocity, and wheel speed of the vehicle, and detect damage to the vehicle from the image information using machine vision algorithms, wherein the machine vision algorithms are trained to detect damage to the vehicle from features associated with collisions in the image information, the features including one or more of broken glass, dents or bends in a vehicle chassis, and deployed airbags;

repeat the steps of obtaining the sensory information and detecting one or more collisions over a period of time;

track the one or more collisions over the period of time as historical collision information, including a number of collisions detected during the period of time;

determine whether the number of collisions detected during the period of time is more than a predetermined number of collisions;

wherein, upon determining that the number of collisions is not more than the predetermined number, continue obtaining the sensory information from both of the at least one sensor associated with the vehicle and the at least one roadway sensor and detects one or more additional collisions; and wherein, upon determining that the number of collisions is more than the predetermined number, automatically adjust an insurance policy according to the historical collision information.

15. The system according to claim 14, wherein adjusting the insurance policy includes increasing an insurance premium for the insurance policy.

16. The system according to claim 14, wherein adjusting the insurance policy includes increasing a deductible for the insurance policy.

17. The system according to claim 14, wherein the at least one processor of the computing device is further configured to:

open at least one insurance claim based on detecting a vehicle collision from the obtained sensory information from both of the at least one sensor associated with the vehicle and the at least one roadway sensor.

18. The system according to claim 14, wherein each roadway sensor of the plurality of roadway sensors further comprises a microphone.

19. The system according to claim 18, wherein the at least one processor of the computing device is further configured to:
- obtain audio information captured by the microphone of the at least one roadway sensor; and
- analyze the audio information to detect a sound of breaking glass or crushing metal to detect the collision.

20. The system according to claim 14, wherein each roadway sensor of the plurality of roadway sensors further comprises a wireless network device.

* * * * *